US009895766B2

(12) United States Patent
Ryu (10) Patent No.: US 9,895,766 B2
(45) Date of Patent: Feb. 20, 2018

(54) ALL-IN-ONE JIGLESS PROJECTION LOADING SYSTEM AND BODY COMPONENT ASSEMBLING METHOD USING THE SAME FOR VEHICLE

(71) Applicant: Hyundai Motor Company, Seoul (KR)

(72) Inventor: Sung Phil Ryu, Seoul (KR)

(73) Assignee: Hyundai Motor Company, Seoul (KR)

( * ) Notice: Subject to any disclaimer, the term of this patent is extended or adjusted under 35 U.S.C. 154(b) by 582 days.

(21) Appl. No.: 14/144,469

(22) Filed: Dec. 30, 2013

(65) Prior Publication Data

US 2015/0001186 A1    Jan. 1, 2015

(30) Foreign Application Priority Data

Jul. 1, 2013 (KR) ................. 10-2013-0076708

(51) Int. Cl.

| B62D 65/02 | (2006.01) |
|---|---|
| B23K 11/25 | (2006.01) |
| B23K 11/00 | (2006.01) |
| B23K 11/14 | (2006.01) |
| B25J 15/06 | (2006.01) |
| B25J 15/00 | (2006.01) |

(Continued)

(52) U.S. Cl.
CPC ............ *B23K 11/14* (2013.01); *B23K 11/252* (2013.01); *B23K 11/253* (2013.01); *B23K 37/04* (2013.01); *B25J 15/009* (2013.01); *B25J 15/0066* (2013.01); *B25J 15/0616* (2013.01); *B25J 19/023* (2013.01); *B62D 65/02* (2013.01); *B23K 2201/006* (2013.01); *Y10S 901/09* (2013.01); *Y10S 901/40* (2013.01); *Y10S 901/47* (2013.01)

(58) Field of Classification Search
CPC .... B23K 11/252; B23K 11/14; B25J 15/0066; B25J 19/023; B25J 15/009; B25J 15/0616; Y10S 901/47; Y10S 901/09; Y10S 901/40
USPC ........ 219/86.24, 86.21, 86.33; 901/9, 40, 47
See application file for complete search history.

(56) References Cited

U.S. PATENT DOCUMENTS

| 4,852,237 A * | 8/1989 | Tradt ..................... B62D 65/06 29/407.04 |
|---|---|---|
| 5,302,799 A * | 4/1994 | Kennedy ................ B23K 9/127 219/124.34 |

(Continued)

FOREIGN PATENT DOCUMENTS

| CN | 1241153 A | 1/2000 |
|---|---|---|
| CN | 101164848 A | 4/2008 |

(Continued)

*Primary Examiner* — David Angwin
*Assistant Examiner* — Biniam Asmelash
(74) *Attorney, Agent, or Firm* — Morgan, Lewis & Bockius LLP (57) ABSTRACT

An all-in-one jigless projection loading system for a vehicle is adapted to load and assemble a body component to a vehicle body. The all-in-one jigless projection loading system may include: a fixing bracket fixed to an arm of a robot; a position adjusting member rotatably mounted to the fixing bracket; a gripper mounted to the fixing bracket to be movable backward and forward, and gripping the body component; an array unit mounted to the position adjusting member, and arraying the body component; and a welding unit mounted to the fixing bracket, and projection-welding the body component to a vehicle body.

9 Claims, 5 Drawing Sheets (51) Int. Cl.
  *B25J 19/02*     (2006.01)
  *B23K 37/04*     (2006.01)
  *B23K 101/00*    (2006.01)

(56) References Cited

U.S. PATENT DOCUMENTS

| | | | | |
|---|---|---|---|---|
| 5,680,694 | A * | 10/1997 | Best | B23P 21/004 29/701 |
| 6,615,112 | B1 * | 9/2003 | Roos | B25J 9/1692 318/568.1 |
| 6,845,295 | B2 * | 1/2005 | Cheng | G05B 19/4103 219/121.61 |
| 8,025,277 | B2 * | 9/2011 | Lin | B25J 15/0052 269/21 |
| 8,157,155 | B2 * | 4/2012 | Diez | B23K 11/11 228/44.3 |
| 2004/0172164 | A1 * | 9/2004 | Habibi | B25J 9/1692 700/245 |
| 2008/0300723 | A1 * | 12/2008 | Ban | B25J 9/1692 700/259 |
| 2009/0070936 | A1 * | 3/2009 | Henderson | A61B 6/0457 5/601 |
| 2009/0245930 | A1 | 10/2009 | Baulier et al. | |
| 2011/0270444 | A1 * | 11/2011 | Nagata | G05B 19/401 700/258 |
| 2011/0282492 | A1 * | 11/2011 | Krause | B25J 9/1664 700/259 |
| 2012/0072021 | A1 * | 3/2012 | Walser | B25J 9/1697 700/254 |
| 2012/0152877 | A1 * | 6/2012 | Tadayon | B25J 5/02 212/224 |
| 2013/0238124 | A1 * | 9/2013 | Suzuki | B25J 9/16 700/250 |

FOREIGN PATENT DOCUMENTS

| | | |
|---|---|---|
| CN | 101593600 A | 12/2009 |
| JP | 2005-329782 A | 12/2005 |
| JP | 2010-264855 A | 11/2010 |
| JP | 2011-147865 A | 8/2011 |
| JP | 2013-103289 A | 5/2013 |
| KR | 10-2007-0004206 A | 1/2007 |
| KR | 10-2012-0063773 A | 6/2012 |

* cited by examiner

ALL-IN-ONE JIGLESS PROJECTION LOADING SYSTEM AND BODY COMPONENT ASSEMBLING METHOD USING THE SAME FOR VEHICLE

CROSS-REFERENCE TO RELATED APPLICATION

The present application claims priority of Korean Patent Application Number 10-2013-0076708 filed Jul. 1, 2013, the entire contents of which application is incorporated herein for all purposes by this reference.

BACKGROUND OF INVENTION

Field of Invention

The present invention relates to an all-in-one jigless projection loading system and a body component assembling method using the same for a vehicle. More particularly, the present invention relates to an all-in-one jigless projection loading system and a body component assembling method using the same for a vehicle body for assembling an additional component to a vehicle body.

Description of Related Art

Generally, a vehicle body becomes a body-in-white (BIW) through a process in which various panels produced in ancillary processes are assembled.

A vehicle body is composed of a floor panel supporting a seat, a driving portion including an engine and axles, and so on, and forming a lower surface thereof, a pair of side panels forming right/left sides thereof, a roof panel forming an upper surface, a cowl panel, a back panel, a package tray, and a plurality of roof rails.

Assembling the body components is performed in the body build-up process. The back panel is joined to the floor panel through a body assemble system, and then the pair of side panels, the roof panel, the roof rail, the package tray, and so on are assembled by welding in the body build-up process.

Meanwhile, a worker initially stacks additional components loaded on a pallet to a storage system in the body build-up process so as to assemble the additional components such as the cowl panel to the vehicle body, which is formed by assembling the floor panel, the back panel, the pair of side panels, the roof panel, and so on.

Thus, the additional components are extracted from a storage system one by one, and the extracted additional components are transferred through a sliding jig. In addition, each additional component is loaded to an array/clamp jig in a state that the additional component is gripped by a robot gripper, is arrayed and clamped in the array/clamp jig, and is welded to the vehicle body by a welding robot such that it is assembled to the vehicle body.

In the conventional art in which the additional components are assembled to the vehicle body through the above mentioned process, a space for installing the storage system, the sliding jig, the array/clamp jig, and the welding robot may be required. Further, the cost of initial investment may be increased.

In addition, the entire working process may be complex as the various processes from loading to welding the components in the conventional art are performed. Furthermore, loading of components to the vehicle body may be deteriorated as the body components are loaded with reference to the jig in the conventional art.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for an all-in-one jigless projection loading system and a body component assembling method using the same for a vehicle, having advantages of realizing an all-in-one type of extracting, arraying, clamping, and welding the body components.

The all-in-one jigless projection loading system for a vehicle according to various aspects of the present invention is adapted to load and assemble a body component to a vehicle body. The all-in-one jigless projection loading system may include: a fixing bracket fixed to an arm of a robot; a position adjusting member rotatably installed at the fixing bracket; a gripper installed at the fixing bracket to be movable backward and forward, and gripping the body component; an array unit installed at the position adjusting member, and arraying the body component; and a welding unit installed at the fixing bracket, and projection-welding the body component to a vehicle body.

The all-in-one jigless projection loading system may further include a video camera installed at the position adjusting member and shooting video of the body component and the vehicle body to be assembled with the body component, and outputting the video data to a controller.

The position adjusting member may be rotatably installed at the fixing bracket by a drive motor.

The controller may gain the video data from the video camera and analyze the video data so as to control the drive motor.

The position adjusting member may be rotated by the drive motor, and may adjust a loading position of the body component with reference to the vehicle body and an array position of the body component.

The gripper may include: a first adsorption gripper installed at one side of the fixing bracket to be movable backward and forward by a first operating cylinder, and vacuum-adsorbing one side of the body component; and a second adsorption gripper installed at the other side of the fixing bracket to be movable backward and forward by a second operating cylinder, and vacuum-adsorbing the other side of the body component.

The array unit may be installed at the position adjusting member to be linearly movable by a moving member, and may include a reference pin coupled to a tooling hole of the body component by a backward operation of the gripper.

The array unit may be installed at the position adjusting member to be movable backward and forward by a clamp cylinder, and may include a pin clamp coupled to the other tooling hole of the body component by a backward operation of the gripper.

The welding unit may include: a first projection welding electrode installed at the fixing bracket; and a second projection welding electrode installed at the fixing bracket to be movable.

The second projection welding electrode may be installed at the fixing bracket to movable for adjusting a pitch with the first projection welding electrode.

The welding unit may include: a mounting bracket fixedly installed at the fixing bracket; a first welding cylinder fixedly installed at the mounting bracket; and a first projection welding electrode connected with the first welding cylinder and adapted to be movable backward and forward.

The welding unit may further include: a moving bracket installed at the mounting bracket to be movable; a second welding cylinder fixedly installed at the moving bracket; and a second projection welding electrode connected with the second welding cylinder, and adapted to be movable backward and forward.

In addition, the all-in-one jigless projection loading system for a vehicle according to various aspects of the present invention is adapted to load and assemble a body component to a vehicle body. The all-in-one jigless projection loading system may be mounted to an arm of a robot by a fixing bracket, and a gripper gripping the body component, an array unit arraying body components, and a welding unit projection-welding the body component to the vehicle body may be integrally composed.

The all-in-one jigless projection loading system may include: a video camera shooting video of the vehicle body to which the body component and the body component are assembled, and outputting the video data to a controller; and a position adjusting member controlled by the controller, and adjusting a loading position of the body component with reference to the vehicle and an array position of the body components.

Further, a body component assembling method for a vehicle may be adapted to load and assemble a body component to a vehicle body by using the all-in-one jigless projection loading system. The method may include: (a) mounting the all-in-one jigless projection loading system at the arm of the robot by the fixing bracket; (b) adsorption-gripping the body component by the gripper of the system, and arraying and clamping by the array unit of the system; (c) transferring the body component to the vehicle body by the robot, and positioning the body component at a home position at the vehicle body; and (d) projection-welding the body component to the vehicle body by the welding unit of the system.

In (b), video of the body component may be shot by a video camera, the video data is outputted to a controller, and the position adjusting member may be rotated by the controller such that a position of the array unit is adjusted.

In (c), video of the vehicle body to be assembled with the body component may be shot by a video camera, resultant video data may be outputted to a controller, and the position adjusting member may be rotated by the controller such that a position of the body component is adjusted.

In (b), the body component may be adsorption-gripped according to the gripper being forwardly moved, and a reference pin of the array unit and a pin clamp may be coupled with a tooling hole of the body component according to the gripper being backwardly moved.

In (c), a pitch between a first projection welding electrode and a second projection welding electrode of the welding unit may be adjusted according to movement of the second projection welding electrode of the welding unit.

The body component such as a cowl panel may be arrayed and clamped, and the body component may be loaded and projection-welded to the vehicle body.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In order to clearly explain the present invention, portions that are not directly related to the present invention are omitted, and the same reference numerals are used for the same or similar constituent elements through the entire specification.

The size and thickness of each element are arbitrarily shown in the drawings, but the present invention is not necessarily limited thereto, and in the drawings, the thickness of layers, films, panels, regions, etc., are exaggerated for clarity.

In the detailed description, components which have the same name are differentiated by ordinal numbers, but are not limited to the sequence.

In addition, unless explicitly described to the contrary, the word "comprise" and variations such as "comprises" or "comprising" will be understood to imply the inclusion of stated elements but not the exclusion of any other elements.

Further, the terms such as " . . . unit", " . . . means", " . . . part", or " . . . member", which are disclosed in the specification, refer to a unit of an inclusive constituent which performs at least one function or operation.

Figure 1:
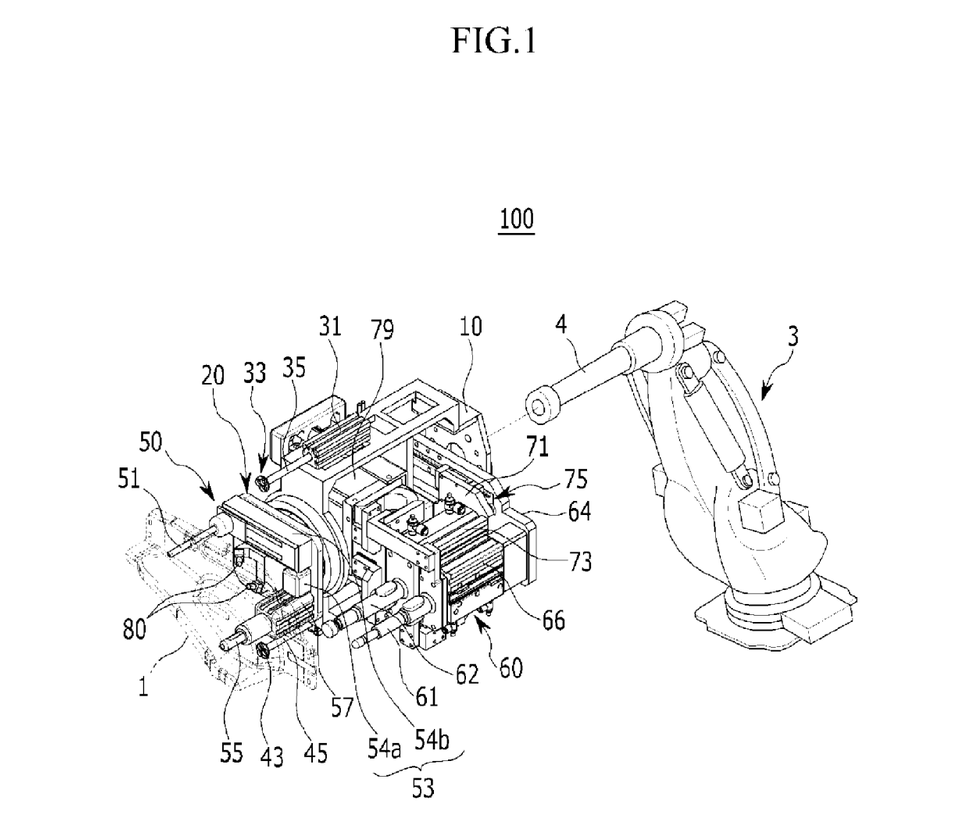
FIG. 1 is a perspective view of an exemplary all-in-one jigless projection loading system for a vehicle according to the present invention.
Figure 2:
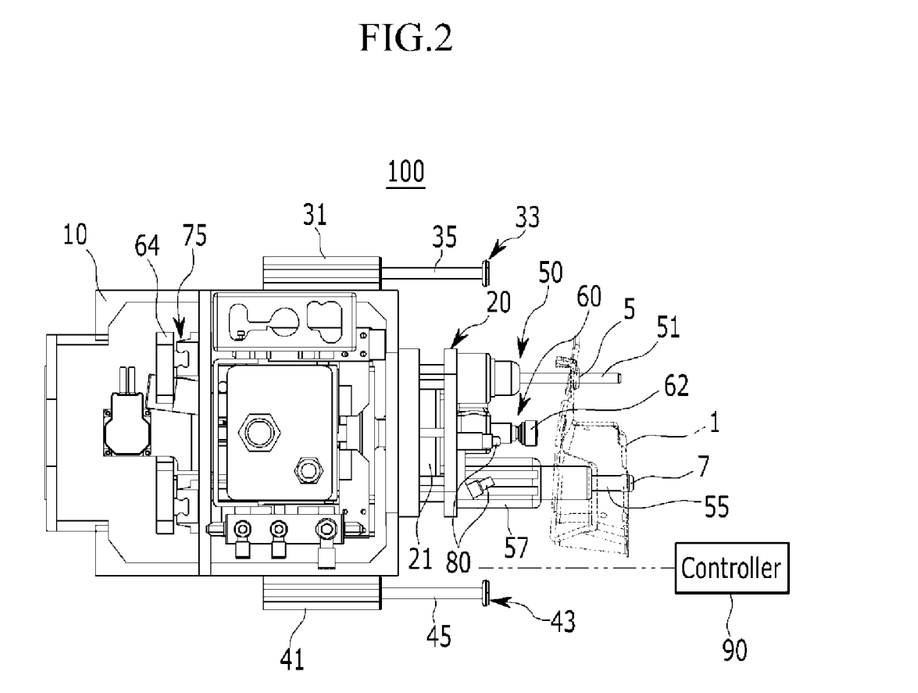
FIG. 2 is a front view of an exemplary all-in-one jigless projection loading system for a vehicle according to the present invention.
Figure 3:
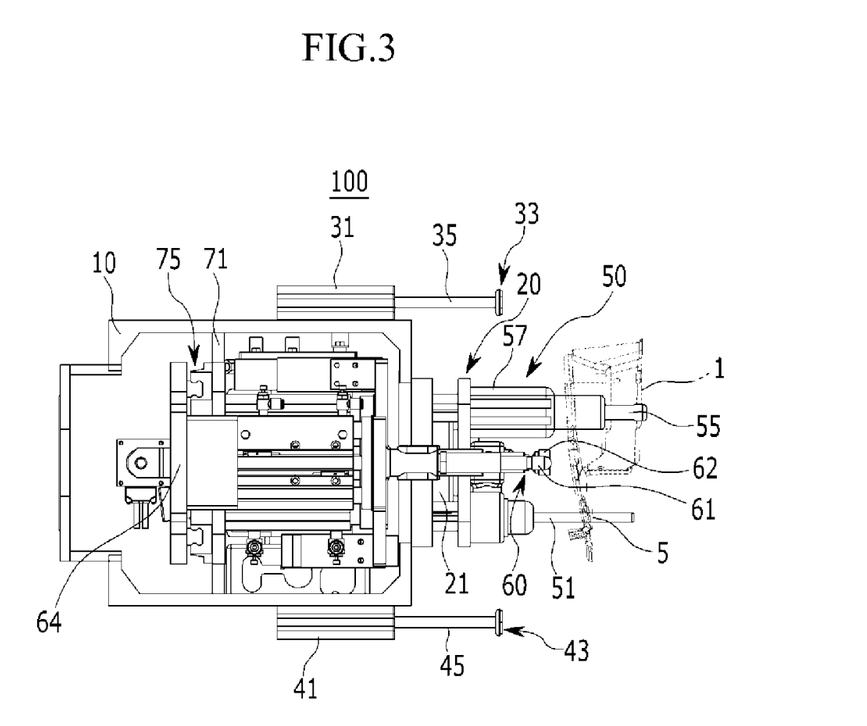
FIG. 3 is a rear view of an exemplary all-in-one jigless projection loading system for a vehicle according to the present invention.

FIG. 1 is a perspective view of an all-in-one jigless projection loading system for a vehicle according to various embodiments of the present invention, and FIG. 2 is a front view of an all-in-one jigless projection loading system for a vehicle according to various embodiments of the present invention, and FIG. 3 is a rear view of an all-in-one jigless projection loading system for a vehicle according to various embodiments of the present invention.

As shown in FIG. 1 to FIG. 3, an all-in-one jigless projection loading system 100 for a vehicle according to various embodiments of the present invention may be applied to the body build-up process for assembling various panels produced in an ancillary body assembly process and then transferred to a vehicle body.

For example, an all-in-one jigless projection loading system 100 for a vehicle according to various embodiments of the present invention may be applied to a process for assembling an additional component (referred to as "body component" hereinafter) such as a cowl panel to the vehicle body which is formed by assembling the floor panel, the back panel, the pair of side panels, the roof panel, and so on in the body build-up process.

Herein, an all-in-one jigless projection loading system 100 for a vehicle according to various embodiments of the present invention is provided for precisely loading a body component 1 to a vehicle body transferred along a transfer line in a state that it is loaded to a transfer unit, and for assembling the body component 1 to the position where the body component is loaded by welding.

The all-in-one jigless projection loading system 100 for a vehicle according to various embodiments of the present invention may be adapted to integrally compose various constituent elements, and may be mounted at an arm 4 of a robot 3. Herein, the robot 3 is disposed in a working space formed at sides of the transfer line.

The all-in-one jigless projection loading system 100 for a vehicle according to various embodiments of the present invention is adapted to extract, array, and clamp the body component 1 loaded on a pallet, to load the body component 1 to a precise position, and to assemble the body component 1 by projection-welding.

That is, the all-in-one jigless projection loading system 100 for a vehicle is provided for realizing all-in-one extracting, arraying, clamping, and projection-welding the body component 1.

The all-in-one jigless projection loading system 100 includes a fixing bracket 10, a position adjusting member 20, grippers 33 and 43, an array unit 50, a welding unit 60, a video camera 80, and a controller 90.

The fixing bracket 10 is mounted at the arm 4 of the robot 3. In addition, the fixing bracket 10 is capable of being coupled to or decoupled from the arm 4 of the robot 3. A tool changer having a general structure is mounted at the fixing bracket 10. That is, the tool changer is selectively coupled to the arm 4 of the robot 3.

Various constituent elements of various embodiments can be mounted at the fixing bracket 10. The fixing bracket 10 is adapted to support the constituent elements, and has various appendages such as a block, a plate, a housing, a cover, a collar, and so on.

However, the appendages are provided for installing each constituent element to the fixing bracket 10. The appendages will be called fixing brackets 10 except under special circumstances.

The position adjusting member 20 is provided so as to adjust a position of the array unit 50, which will be explained in greater detail below. Substantially, the position adjusting member 20 is provided so as to adjust a position of the body component 1 arrayed and clamped at the array unit 50.

Figure 4:
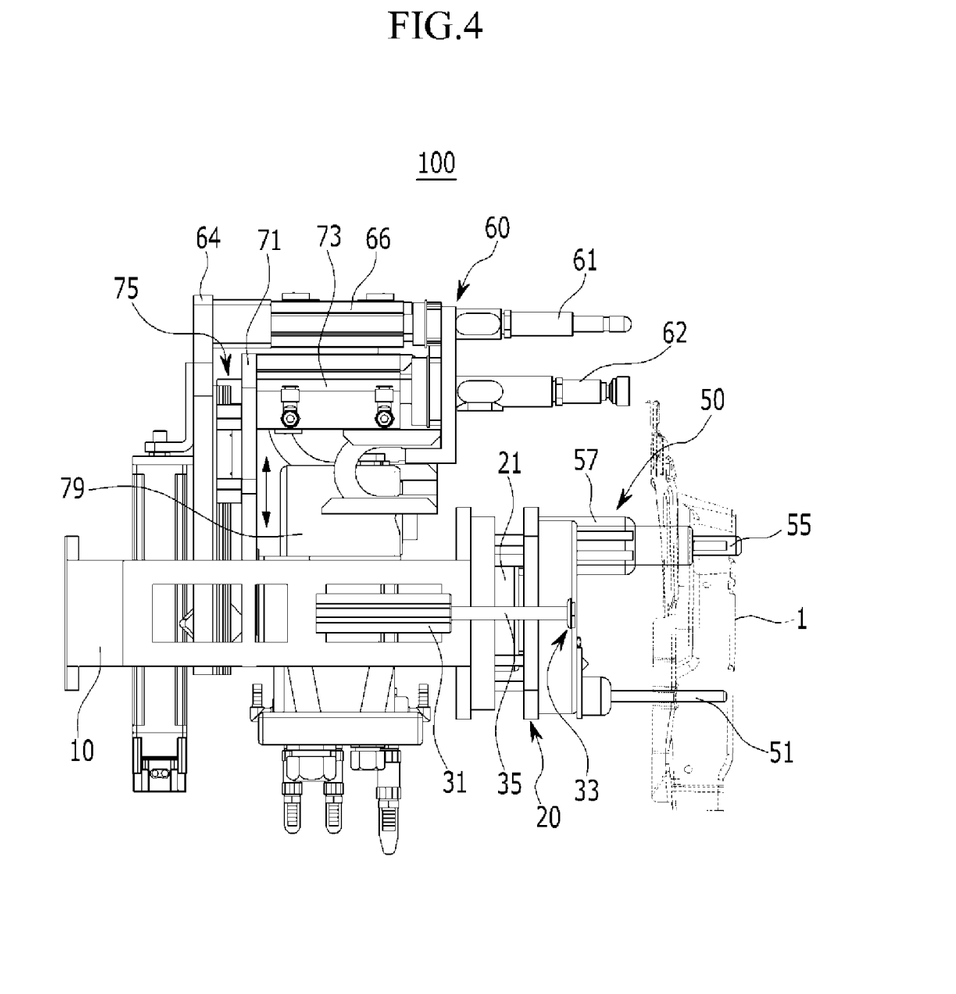
FIG. 4 is a top plan view of an exemplary all-in-one jigless projection loading system for a vehicle according to the present invention.

Referring to the top plan view of an all-in-one jigless projection loading system 100 for a vehicle according to various embodiments of the present invention shown in FIG. 4, the position adjusting member 20 is rotatably installed to the fixing bracket 10.

The position adjusting member 20 is installed to be rotatable in both directions by a drive motor 21, and is disposed as a rotation member connected with a rotation shaft of the drive motor 21.

Therefore, a loading position of the body component 1 with reference to the vehicle body and an array position of the body component 1 and the vehicle body can be adjusted according to the position adjusting member 20 being rotated in both directions by the drive motor 21.

The grippers 33 and 43 grip the body component 1 loaded on a pallet by adsorption, and may be installed at the fixing bracket 10 to be movable back and forth.

As shown in FIG. 2, the grippers 33 and 43 may include a first adsorption gripper 33 installed at one side (an upper portion in the figure) of the fixing bracket 10 and a second adsorption gripper 43 installed at the other side (a lower portion in the figure) of the fixing bracket 10.

The first adsorption gripper 33 is disposed to be movable back and forth by a first operating cylinder 31, and the second adsorption gripper 43 is disposed to be movable back and forth by a second operating cylinder 41.

Herein, the first adsorption gripper 33 vacuum-adsorbs one side of the body component 1 by air pressure, and may be installed to a first operating rod 35 of the first operating cylinder 31.

In addition, the second adsorption gripper 43 vacuum-adsorbs the other side of the body component 1 by air pressure, and may be installed to a second operating rod 45 of the second operating cylinder 41.

The first and second adsorption grippers 33 and 43 can grip the one side and the other side of the body component 1 by air pressure according to forward movement of the first and second operating rods 35 and 45 of the first and second operating cylinders 31 and 41.

In addition, the first and second adsorption grippers 33 and 43 can move the body component 1 toward the array unit 50 according to backward movement of the first and second operating rods 35 and 45 of the first and second operating cylinders 31 and 41.

The array unit 50 is provided so as to determine an arraying reference point of the body component 1 gripped at the first and second adsorption grippers 33 and 43 and array and clamp the body component 1.

Referring to FIG. 1 to FIG. 4, the array unit 50 includes a reference pin 51 and a pin clamp 55.

The reference pin 51 is installed at the position adjusting member 20, and may be coupled with a tooling hole 5 of the body component 1 moved by the backward operation of the first and second adsorption grippers 33 and 43.

Herein, the reference pin 51 is installed to be linearly movable by a moving member 53 according to a position of the tooling hole 5 of the body component 1. The moving member 53 is an electric unit which linearly moves along one axis direction at the position adjusting member 20.

The moving member 53 is a general LM transport unit (carrier) including an LM motor 54a and an LM guide module 54b for moving along one axis direction such that a detailed description thereof will be omitted.

The pin clamp 55 arrays the body component 1 and clamps the body component 1. In addition, the pin clamp 55 is installed to be movable back and forth at the position adjusting member 20, and may be coupled with another tooling hole 7 of the body component 1 moved by the backward operation of the first and second adsorption grippers 33 and 43. That is, the pin clamp 55 is a clamping pin to move back and forth by a clamp cylinder 57.

The pin clamp 55 is well-known to a person of ordinary skill in the art such that a detailed description thereof will be omitted.

As shown in FIG. 1 and FIG. 4, the welding unit 60 is gripped by the grippers 33 and 43, and is provided for projection-welding the body component 1 arrayed by the array unit 50 to the vehicle body by using electrical resistance.

The welding unit 60 includes a first projection welding electrode 61 installed at the fixing bracket 10 and a second projection welding electrode 62 installed to be movable at the fixing bracket 10.

Herein, the first projection welding electrode 61 may be an anode and the second projection welding electrode 62 may be a cathode in the projection welding. In this case, the second projection welding electrode 62 may be installed at the fixing bracket 10 to be movable for adjusting a pitch with the first projection welding electrode 61.

The welding unit 60 according to various embodiments of the present invention will now be described in detail, and includes a mounting bracket 64 fixedly installed at the fixing bracket 10, a first welding cylinder 66 fixedly installed at the mounting bracket 64, and the first projection welding electrode 61 connected with the first welding cylinder 66 and adapted to be movable back and forth.

The welding unit 60 may further include a moving bracket 71 installed to be movable at the mounting bracket 64, a second welding cylinder 73 fixedly installed at the moving bracket 71, and the second projection welding electrode 62 connected with the second welding cylinder 73 and adapted to be movable back and forth.

In this case, the moving bracket 71 is an electric unit which linearly moves along one axis direction by a moving member 75 at the mounting bracket 64. The moving member 75 may be a general LM transport unit (carrier) including an LM motor and an LM guide module for moving along one axis direction.

The first and second projection welding electrodes 61 and 62 receive welding current from a transistor 79 disposed at the fixing bracket 10, and can projection-weld the body component 1 to the vehicle body by using electrical resistance.

As shown in FIG. 1 and FIG. 2, the video camera 80 according to various embodiments of the present invention is installed as a pair at the position adjusting member 20, they shoot video of the body component 1 and the vehicle body to be assembled with the body component 1, and they output the video data to the controller 90.

The video camera 80 may include a camera portion having an optical system and shooting video of the body component 1 and a part of the vehicle body assembled with the body component 1, and a lamp portion radiating light toward the body component 1 and the part of the vehicle body assembled with the body component 1.

The camera portion and the lamp portion of the video camera 80 are well-known to a person of ordinary skill in the art such that a detailed description thereof will be omitted.

The controller 90 controls the entire operation of the system 100, and simultaneously gains video data from the video cameras 80 and then analyzes the video data so as to control operations of the drive motor 21 and the moving members 53 and 75.

That is, the controller 90 gains the video data of the body component 1 and the vehicle body that will be assembled with the body component 1 from the video cameras 80, and then analyzes the video data so as to transmit electrical control signals to the drive motor 21 and the moving member 53 and 75.

Therefore, the drive motor 21 is driven by control signals of the controller 90, and can rotate the position adjusting member 20. That is, the position adjusting member 20 is rotated by the drive motor 21 such that a loading position of the body component 1 with reference to the vehicle body and an array position of the body component 1 are substantially adjusted.

The moving members 53 and 75 are driven by control signals of the controller 90, and can linearly move the reference pin 51 of the array unit 50, and can further move the second projection welding electrode 62 linearly.

Hereinafter, a body component assembling method using the all-in-one jigless projection loading system 100 for a vehicle according to various embodiments of the present invention will be described with reference to the accompanying drawings.

Figure 5:
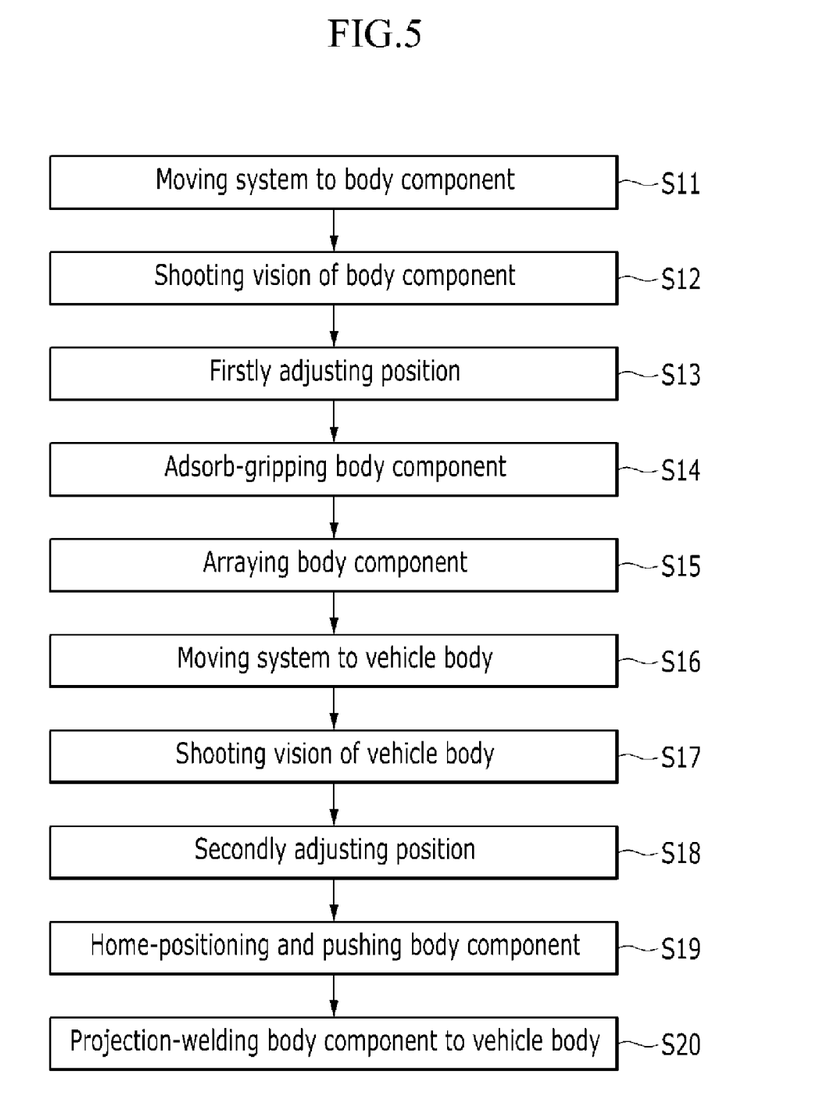
FIG. 5 is a flowchart of a body component assembling method using an exemplary all-in-one jigless projection loading system for a vehicle according to the present invention.

FIG. 5 is a flowchart of a body component assembling method using an all-in-one jigless projection loading system for a vehicle according to various embodiments of the present invention.

Referring to FIG. 1 to FIG. 5, there is the state in which the vehicle body is transferred along a transfer line to a working position at which the robot 3 is disposed.

In addition, the all-in-one jigless projection loading system 100 for a vehicle according to various embodiments of the present invention is mounted to the arm of the robot 3 by the fixing bracket 10.

On this state, the system 100 is moved to the pallet on which the body component 1 is loaded by the robot 3 at step S11, and then the video camera 80 shoots video of the body component 1 such that the video data is outputted to the controller 90 at step S12.

In addition, the controller 90 gains the video data of the body component 1 from the video camera 80 and analyzes the video data so as to transmit electrical control signals to the drive motor 21.

The drive motor 21 is driven by the control signals of the controller 90 such that the position adjusting member 20 is rotated. Therefore, the position adjusting member 20 is rotated by the drive motor 21 such that the position of the array unit 50 is adjusted at step S13.

Then, the system 100 is moved in a direction (for example, from an upper side to a lower side) toward the body component 1 of the pallet by the robot 3, and the first and second adsorption grippers 33 and 43 of the system 100 adsorb-grip the one side and the other side of the body component 1 by air pressure according to forward movement of the first and second operating rods 35 and 45 of the first and second operating cylinders 31 and 41 at step S14.

Subsequently, the first and second adsorption grippers 33 and 43 move the body component 1 toward the array unit 50 according to backward movement of the first and second operating rods 35 and 45 of the first and second operating cylinders 31 and 41.

Herein, the reference pin 51 of the array unit 50 is linearly moved to a position corresponding to the tooling hole 5 of the body component 1 by the moving member 53 as the electrical control signal is transmitted to the moving member 53 by analyzing the video data of the body component 1 through the controller 90.

Thus, the reference pin 51 may be coupled with the tooling hole 5 of the body component 1 moved by a backward operation of the first and second adsorption grippers 33 and 43. The pin clamp 55 of the array unit 50 may be moved forward by the clamp cylinder 57 and be simultaneously coupled with the other tooling hole 7 of the body component 1 moved by a backward operation of the first and second adsorption grippers 33 and 43.

Therefore, the reference pin 51 and the pin clamp 55 are coupled with the tooling holes 5 and 7 of the body component 1 moved by a backward operation of the first and second adsorption grippers 33 and 43, and an arraying reference point of the body component 1 gripped at the first and second adsorption grippers 33 and 43 is determined so as to array and clamp the body component 1 at step S15.

In the state that the body component 1 is gripped by the first and second adsorption grippers 33 and 43 and is arrayed by the reference pin 51 and the pin clamp 55 of the array unit 50, the body component 1 is moved to the vehicle body to be assembled with the body component 1 together with the system 100 by the robot 3 at step S16.

Thus, in the state that the body component 1 is positioned near the vehicle body to be assembled with the body component 1, the video of the vehicle body is shot by the video cameras 80, and then the video data is outputted to the controller 90 at step S17.

The controller 90 gains the video data of the vehicle body from the video camera 80, and then analyzes the video data so as to transmit electrical control signals to the drive motor 21.

Therefore, the drive motor 21 is driven by the control signals of the controller 90 such that the position adjusting member 20 is rotated, and the position adjusting member 20 is rotated by the drive motor 21 such that the body component 1 is adjusted to a position corresponding to the vehicle body at step S18.

Subsequently, the body component 1 is moved to the vehicle body by operation of the robot 3, and the body component 1 is positioned to a home position with reference to the vehicle body such that the body component 1 is pushed at step S19.

In this case, the electrical control signal is transmitted to the moving member 75 by analyzing the video data of the vehicle body through the controller 90 such that the second projection welding electrode 62 of the welding unit 50 is moved to a point corresponding to a welding target point by the moving member 75 so as to adjust a pitch with the first projection welding electrode 61.

Subsequently, the first and second projection welding electrodes 61 and 62 of the welding unit 60 are moved forward by the first and second welding cylinders 66 and 73, and simultaneously receive the welding current from the transistor 79 so as to projection-weld the body component 1 to the vehicle body by the electrical resistance at step S20.

Therefore, the body component 1 such as a cowl panel is loaded to the vehicle body and assembled with the vehicle body by projection-welding through the above-mentioned processes.

According to various embodiments of the present invention, the body component 1 loaded on the pallet is extracted, arrayed, and clamped by the simple all-in-one system and method. In addition, the body component 1 can be loaded to an exact position of the vehicle body, and can then be assembled with the vehicle body by projection-welding.

Thus, an installation space of devices becomes small, an investment cost is decreased, man-hours are reduced, and the entire process becomes simple as the extracting, arraying, clamping, and welding of the body component 1 are realized by the simple all-in-one system and method.

Furthermore, the body component 1 is loaded with reference to the vehicle body according to various embodiments of the present invention, unlike a conventional art in which the body component 1 is loaded with reference to a jig, such that the loading of the body component 1 to the vehicle body is improved.

For convenience in explanation and accurate definition in the appended claims, the terms upper or lower, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An all-in-one jigless projection loading system for a vehicle adapted to load and assemble a body component to a vehicle body, the all-in-one jigless projection loading system comprising:
   a fixing bracket fixed to a robot arm;
   a position adjusting member rotatably mounted to the fixing bracket;
   a gripper mounted to the fixing bracket and movable backward and forward, the gripper configured for gripping the body component;
   an arraying unit including a reference pin and a pin clamp and mounted to the position adjusting member and configured for arraying the body component according to a signal of a controller;
   a welding unit mounted to the fixing bracket, the welding unit projection-welding the body component to the vehicle body; and
   a video camera mounted to the position adjusting member and acquiring video data of the body component and the vehicle body to be assembled with the body component, and outputting the video data to the controller,
   wherein the arraying unit is mounted to the position adjusting member to be linearly movable by a moving member, and the reference pin is coupled to a first tooling hole of the body component by a backward operation of the gripper, and
   wherein the arraying unit is mounted to the position adjusting member to be movable backward and forward by a clamp cylinder, and the pin clamp is coupled to a second tooling hole of the body component by a backward operation of the gripper.

2. The all-in-one jigless projection loading system of claim 1, wherein the position adjusting member is rotatably mounted to the fixing bracket by a drive motor.

3. The all-in-one jigless projection loading system of claim 2, wherein the controller gains the video data from the video camera and analyzes the video data so as to control the drive motor.

4. The all-in-one jigless projection loading system of claim 2, wherein the position adjusting member is rotated by the drive motor, and adjusts a loading position of the body component with reference to the vehicle body and an array position of the body component.

5. The all-in-one jigless projection loading system of claim 1, the gripper comprising:
   a first adsorption gripper mounted to a first side of the fixing bracket to be movable backward and forward by a first operating cylinder, and vacuum gripping a first side of the body component; and
   a second adsorption gripper mounted to a second side of the fixing bracket to be movable backward and forward by a second operating cylinder, and vacuum gripping a second side of the body component.

6. The all-in-one jigless projection loading system of claim 1, wherein the welding unit comprises:
   a first projection welding electrode mounted to the fixing bracket; and
   a second projection welding electrode mounted to the fixing bracket to be movable.

7. The all-in-one jigless projection loading system of claim 6, wherein the second projection welding electrode is mounted to the fixing bracket to be movable for adjusting a pitch with the first projection welding electrode.

8. The all-in-one jigless projection loading system of claim 1, wherein the welding unit comprises:
   a mounting bracket fixedly mounted to the fixing bracket;
   a first welding cylinder fixedly mounted to the mounting bracket; and
   a first projection welding electrode connected with the first welding cylinder and configured to be movable backward and forward.

9. The all-in-one jigless projection loading system of claim 8, wherein the welding unit further comprises:
   a moving bracket mounted to the mounting bracket to be movable;
   a second welding cylinder fixedly mounted to the moving bracket; and
   a second projection welding electrode connected with the second welding cylinder, and configured to be movable backward and forward.

* * * * *